(12) United States Patent
Murphy et al.

(10) Patent No.: US 10,528,116 B2
(45) Date of Patent: Jan. 7, 2020

(54) FAST RESUME FROM HIBERNATE

(71) Applicant: Seagate Technology LLC, Cupertino, CA (US)

(72) Inventors: Robert Dale Murphy, Longmont, CO (US); Robert William Dixon, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 554 days.

(21) Appl. No.: 13/803,015

(22) Filed: Mar. 14, 2013

(65) Prior Publication Data

US 2016/0011640 A1    Jan. 14, 2016

(51) Int. Cl.
*G06F 1/00* (2006.01)
*G06F 1/3234* (2019.01)

(52) U.S. Cl.
CPC .......... *G06F 1/3268* (2013.01); *Y02D 10/154* (2018.01)

(58) Field of Classification Search
None
See application file for complete search history.

(56) References Cited

U.S. PATENT DOCUMENTS

| 5,666,540 A | 9/1997 | Hagiwara et al. |
| 6,385,721 B1 * | 5/2002 | Puckette ............... G06F 9/4408 713/2 |
| 7,017,037 B2 | 3/2006 | Fortin |
| 7,107,444 B2 | 9/2006 | Fortin |
| 7,971,081 B2 | 6/2011 | Cooper et al. |
| 8,949,508 B2 | 2/2015 | Wakrat et al. |
| 2006/0277360 A1 | 12/2006 | Sutardja et al. |
| 2008/0082743 A1 * | 4/2008 | Hanebutte et al. ............ 711/113 |
| 2008/0239552 A1 | 10/2008 | Kimura |
| 2009/0182933 A1 | 7/2009 | Jang et al. |
| 2010/0064126 A1 | 3/2010 | Yi |
| 2010/0174934 A1 | 7/2010 | Zhao |
| 2014/0164675 A1 * | 6/2014 | Ehrlich et al. ................ 711/103 |

FOREIGN PATENT DOCUMENTS

| CN | 1832014 | 9/2006 |
| CN | 101443726 | 5/2009 |

* cited by examiner

*Primary Examiner* — David Yi
*Assistant Examiner* — Craig S Goldschmidt
(74) *Attorney, Agent, or Firm* — Setter Roche LLP; Christian W. Best

(57) ABSTRACT

Apparatuses, systems, and methods for implementing fast resume from hibernate are disclosed. In one embodiment, an apparatus can include a data storage device having a circuit configured to determine a first memory location of hibernation data without receiving an indication of the first memory location from the host, and store the hibernation data to a second memory location of the DSD.

14 Claims, 5 Drawing Sheets

| 84h | H$_{Begin}$ | S$_{Begin}$ | C$_{Begin}$ | CE$_h$ | H$_{End}$ | S$_{End}$ | C$_{End}$ | Starting Sector | Partition Size |
|---|---|---|---|---|---|---|---|---|---|

400

FIG. 4

FAST RESUME FROM HIBERNATE

BACKGROUND

The present disclosure relates to hibernation functions in computer systems and storage devices.

SUMMARY

A data storage device may include a circuit configured to determine a first memory location of hibernation data without receiving an indication of the first memory location from a host, and to store the hibernation data to a second memory location of the data storage device.

A method, which is performed within a data storage device (DSD) removable from a host, may determine a first memory location of hibernation data without receiving an indication of the first memory location from a host. The method may store the hibernation data in a second memory location of the data storage device.

A device may include a first memory, a second memory having at least one different property than the first memory, a controller. The controller can be configured to determine a first data storage location of hibernation data at the first memory without receiving an indication of the first data storage location from a host, and store the hibernation data to a second data storage location of the second memory.

BRIEF DESCRIPTION OF THE DRAWINGS

FIG. 4 is a sample partition table for fast resume from hibernate;

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Computer systems may be placed in a hibernation state in order to save power while preserving the status of an operating system. However, a problem can occur due to the time lapse between when the user brings a computer out of hibernation to when the computer is fully up and running, which can be as long as 20 to 30 seconds. An operating system can have drivers and interfaces with a data storage device (DSD) to provide information to a DSD for faster startup times. However, such drivers and interfaces may be cumbersome. Thus, systems and methods are presented herein to reduce startup time and eliminate a need for additional drivers and interfaces.

Figure 1:
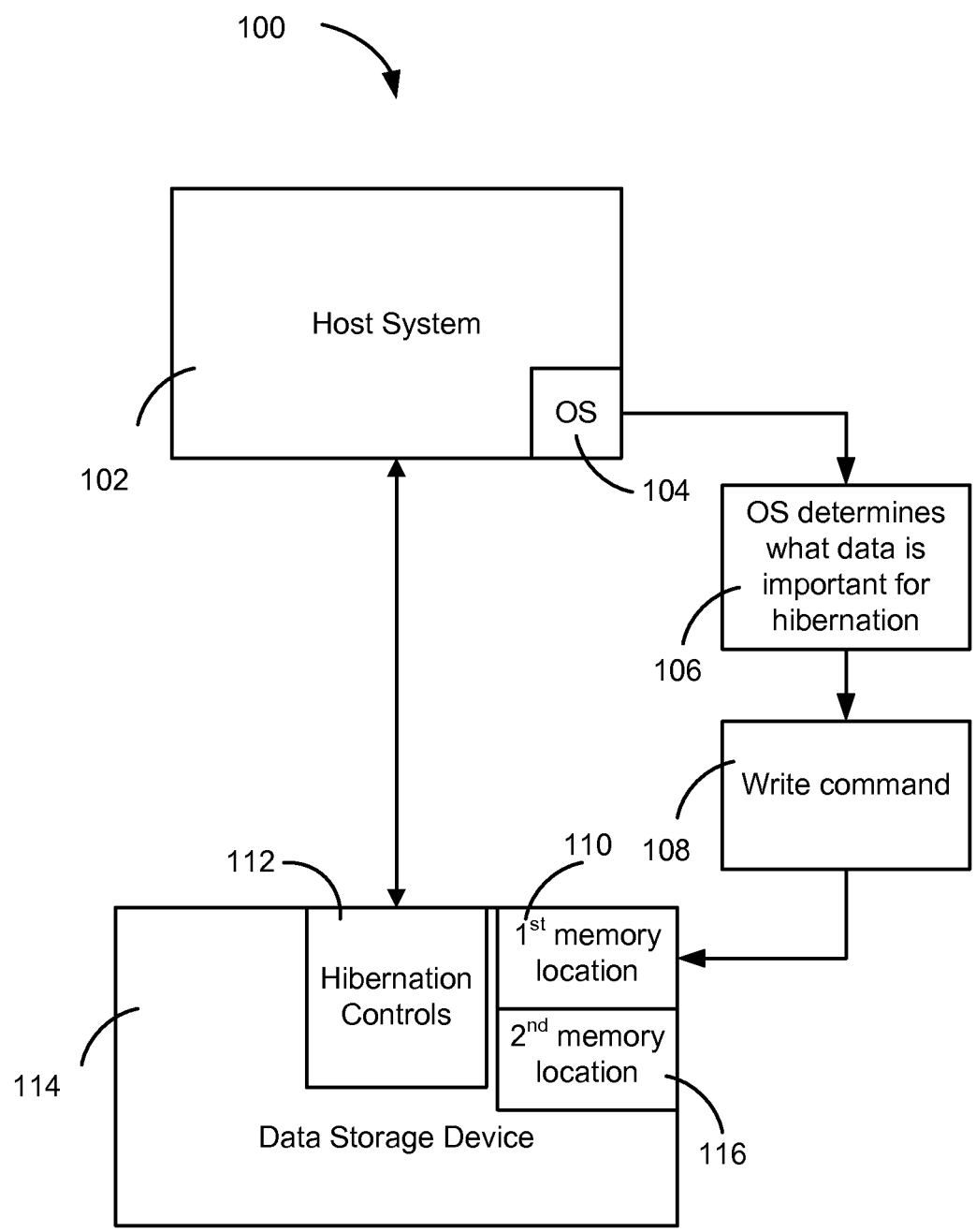
FIG. 1 is a diagram of an illustrative embodiment of a system with fast resume from hibernate.

Referring to FIG. 1, an illustrative embodiment of a system with fast resume from hibernate is shown, and generally designated 100. A host 102 system may be a desktop, laptop, tablet, phone, or any other computing system that may use a hibernation system. The host system 102 may contain an operating system (OS) 104, which can determine data important to store when in a hibernation state, at 106. The hibernation data can be written, at 108, to a first memory location 110 of the DSD 114. The first memory location 110 may be a non-volatile solid state medium, a disk storage medium, or any other storage medium.

Further, the host system 102 may be in communication with hibernation controls 112, which may be implemented using software, a controller, hardware logic, discrete circuits, or any combination thereof. The DSD 114 may be a hybrid device, a solid state device, an optical device, a magnetic device, any other type of data storage device, or any combination thereof.

The host system 102 may send hibernation data to the DSD 114, and may instruct the DSD 114 to store the hibernation data to a hibernation partition. In some embodiments, the hibernation partition can be designated via a partition identifier (ID). Each partition can have a partition ID; however, a partition ID may vary based on a type of OS. For example, in a Microsoft Windows 7 OS, a partition ID of a hibernation partition is 84 h. The DSD 114 may know which partition ID value indicates a hibernation partition, but the DSD 114 may not inherently know a logical block addresses (LBA) range or a physical location where a hibernation partition is located.

During operation, the hibernation controls 112 can be configured to independently determine the location of the hibernation data without notification from the host 102. The hibernation controls 112 may determine the location of the hibernation data based on a partition type.

In one example, the hibernation controls 112 can scan a master boot record (MBR) for a partition ID corresponding to the hibernation partition. If the hibernation partition is found, the hibernation controls 112 may compute the location of the hibernation partition by determining the logical block addresses (LBA) range for the hibernation partition. In this example, no host hinting is required for the DSD 114 to locate the hibernation partition or hibernation data. The hibernation partition may include a non-volatile, solid state medium, a disk storage medium, or any other storage medium.

The hibernation controls 112 may assign the hibernation data to a second memory location 116 by selecting an appropriate partition and then designating the second memory location 116 for subsequent reads and write. The second memory location 116 of the LBA range may include a non-volatile solid state medium that can have a faster access time than the first memory location, and may be located on any tier of a multi-tiered DSD. As an example, if tiers one and two of a multi-tier memory system are faster than tier three, and the first memory location could be located on tier three, and the second memory location may be located on tier one or tier two. The second memory partition may include a non-volatile solid state medium, a disk storage medium, or any other storage medium.

Figure 2:
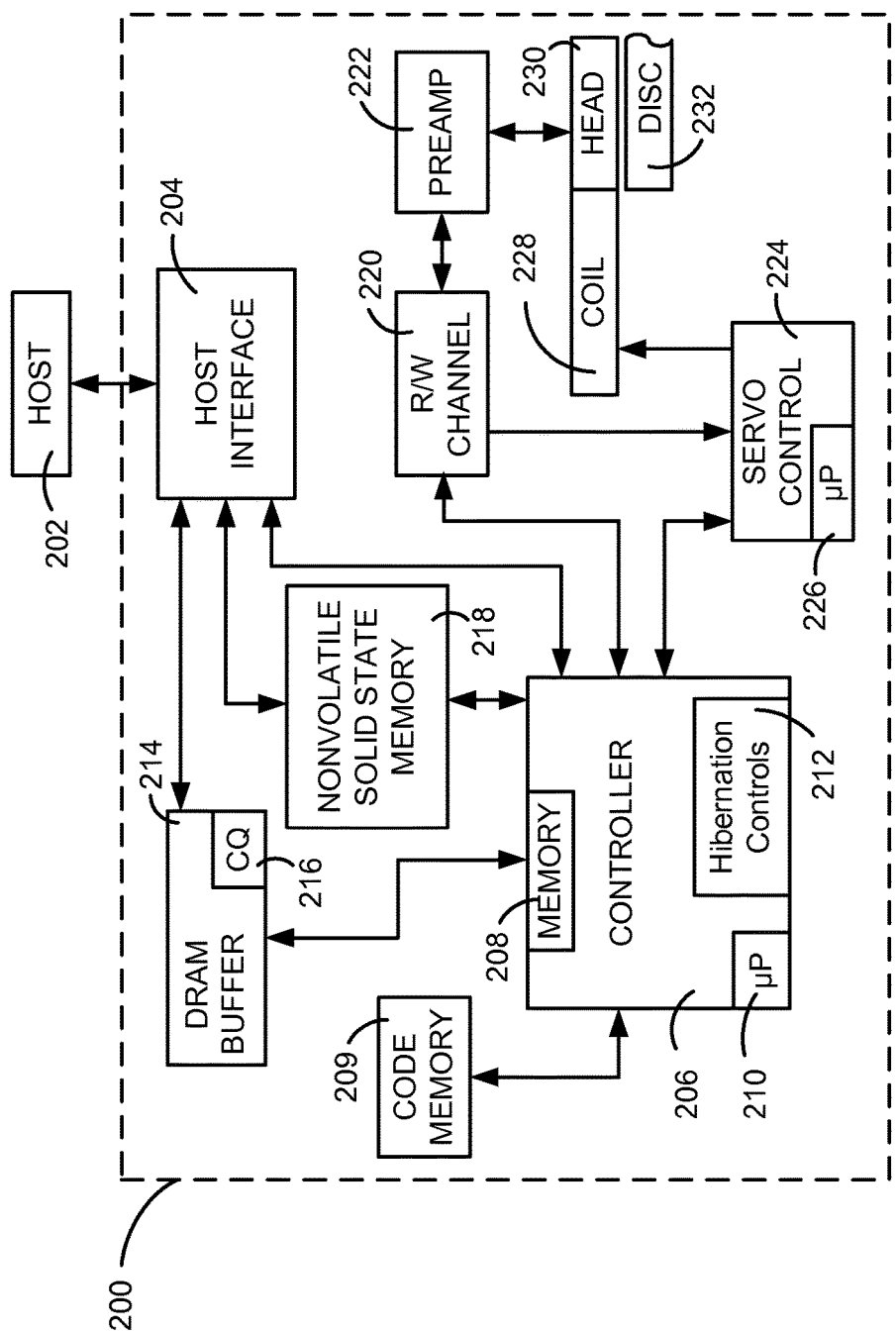
FIG. 2 is a diagram of another illustrative embodiment of a system with fast resume from hibernate.

Referring to FIG. 2, an embodiment of a data storage device with a fast resume from hibernate is shown and generally designated 200. The data storage device 200 can communicate with a host device 202 via an interface 204 that may include a connector that allows the data storage device 200 to be physically removed from the host 202. The interface 204 may include hardware circuits, logic, firmware, or any combination thereof. In a particular embodiment, the interface 204 comprises an interface that allows attachment of a data storage device to another computer system, such as USB, IEEE 1394, Compact Flash, SATA, eSATA, PATA, SCSI, SAS, or Fiber Channel. The data storage device 200 may be internal or external to an enclosure of the host 202.

The data storage device 200 can include a programmable controller 206 with associated memory 208 and processor 210. The programmable controller 206 may be coupled to a memory 209 and buffer 214. The memory 209 may be a nonvolatile solid state memory, such as Flash or EEPROM, that is capable of storing firmware code, or boot code, to allow the controller to perform functions of the data storage device 200, such as a spin-up sequence for the disc 232. The buffer 214 can temporarily store user data during read and write operations and can include a command queue (CQ) 216 where multiple pending access operations can be temporarily stored pending execution. The CQ 216 may be located in a nonvolatile memory or a volatile memory.

Further, FIG. 2 further shows the data storage device 200 can include a read/write (R/W) channel 220 which encodes data during write operations and reconstructs user data retrieved from disc(s) 232 during read operations. A preamplifier/driver circuit (preamp) 222 may apply write currents to the head(s) 230 and may provide pre-amplification of readback signals. A servo control circuit 224 can use servo data to provide the appropriate current to the coil 228 to position the head(s) 230. The controller 206 can communicate with a processor 226 to move the head(s) 230 to the desired locations on the disc(s) 232 during execution of various pending commands in the command queue 216.

On a particular embodiment, the data storage device 200 may also include hibernation controls 212, which may be firmware, logic, or circuits internal to the controller 206 or may be external to the controller. The hibernation controls 212 may be the hibernation controls 112 as shown in FIG. 1 and the DSD 200 may be the DSD 114 as shown in FIG. 1. The host 202 may send a command to the DSD 200, via the host interface 204, to store hibernation data in a first memory location, which may be located on a hibernation partition of one or more of the data storage mediums of the DSD 200. The hibernation partition may include a non-volatile solid state medium 218, a disk storage medium 232, or any other storage medium.

During operation, the hibernation controls 212 can be configured to independently determine the location of the hibernation data without notification from the host. For example, the hibernation controls 212 can determine the location of the hibernation data based on a partition type. To implement this, the hibernation controls 212 may scan a master boot record (MBR) for a partition ID corresponding to a hibernation partition. If a hibernation partition is found, the hibernation controls 212 may compute a location of the hibernation partition by determining a logical block address (LBA) range for the hibernation partition. Thus, no host hinting is required for the DSD 200 to locate the hibernation partition or hibernation data. The hibernation controls 212 may assign the hibernation data to a second memory location by selecting an appropriate location, such as another partition or data storage medium, and then designating the second memory location for subsequent reads and write intended for the hibernation partition. The second memory location may have a faster access time than the first memory location. The second memory location may include a non-volatile solid state medium, a disk storage medium, or any other storage medium.

The memory storage capacity of the DSD 200, or any of the data storage mediums therein, may be divided into logical or physical partitions. Partitions may have similar or different functions, and may be located on any of the available data storage memories in the DSD 200, such as the non-volatile solid state medium 218 or the disk storage medium 232.

Figure 3:
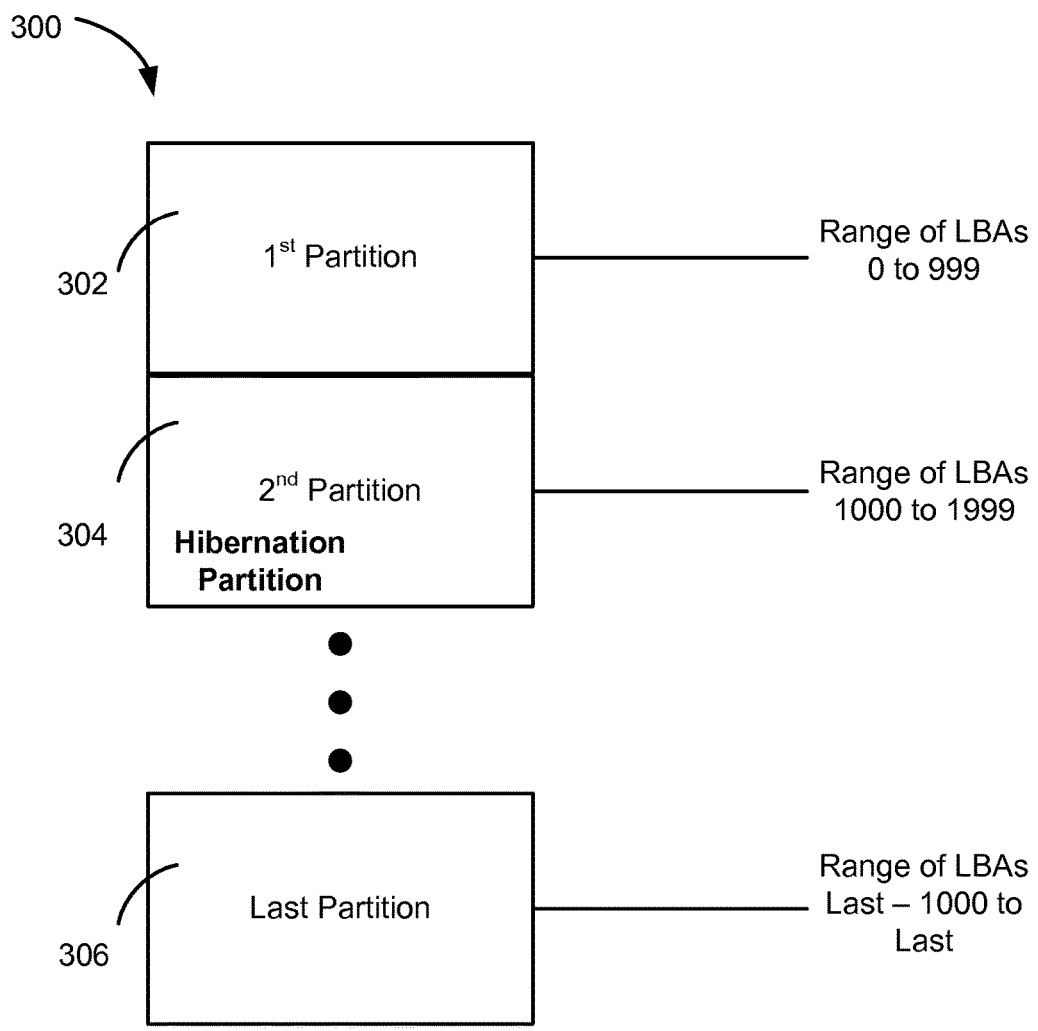
FIG. 3 is a diagram of an illustrative embodiment of storage partitions with fast resume from hibernate.

Referring to FIG. 3, a diagram of an illustrative embodiment of storage partitions with fast resume from hibernate is shown and generally designated 300. In the example of FIG. 3, there may be several partitions associated with a DSD, such as a first partition 302, a second partition 304, and an nth partition 306. Each partition may have an assigned partition type, where at least one of the partitions may be designated as a hibernation partition. In the example shown in FIG. 3, the second partition 304 may be designated as the hibernation partition and may have an associated range of logical block addresses (LBAs), such as from 1000 to 1999.

The assigned partition type may be defined or created by an OS, or created to comply with a specific requirement of an OS. Each partition may have a different partition type and there may be one or more partitions or partition types that designate a partition as a hibernate partition. An assigned partition type may be designated in a partition record, such as the example master boot record (MBR) shown in FIG. 4.

Referring to FIG. 4, generally 400, an example of a partition record in the form of a master boot record (MBR) partition table is shown. Such a table can store identifying information and other useful information related to partitions within a DSD. In this example 400, from left to right, the entries in the table can include a partition type identifier, a head begin value, a sector begin value, a cylinder begin value, a partition identifier (CEh), a head end value, a sector end value, a cylinder end value, a starting sector value, and a partition size value. Such an example table can be used with a cylinder-head-sector based data storage medium and can provide the information needed to access and use the partitions of the data storage medium. However, variations of the table can be constructed with more or less entries as needed based on the type of DSD and an associated OS.

The systems and functions herein can work with any type of system that indicates a partition type. A partition table or record may be stored in memory of a DSD, which can allow the DSD or an OS to search the partition record to determine which partitions are designated as hibernate partitions. In addition, the DSD or OS could choose to select other partition types to promote the data storage associated therewith to a faster or more reliable level of data storage than a current physical location.

Further, a DSD may employ different identification systems, such as an MBR or a GUID Partition Table (GPT). An MBR identification systems can support DSDs with up to four primary partitions and GPT identification systems can support DSDs with an unlimited number of partitions. Further, the DSDs described here can be compatible with the Unified Extensible Firmware Interface (UEFI) initiative, which is a replacement for the Basic Input/Output System (BIOS).

Figure 5:
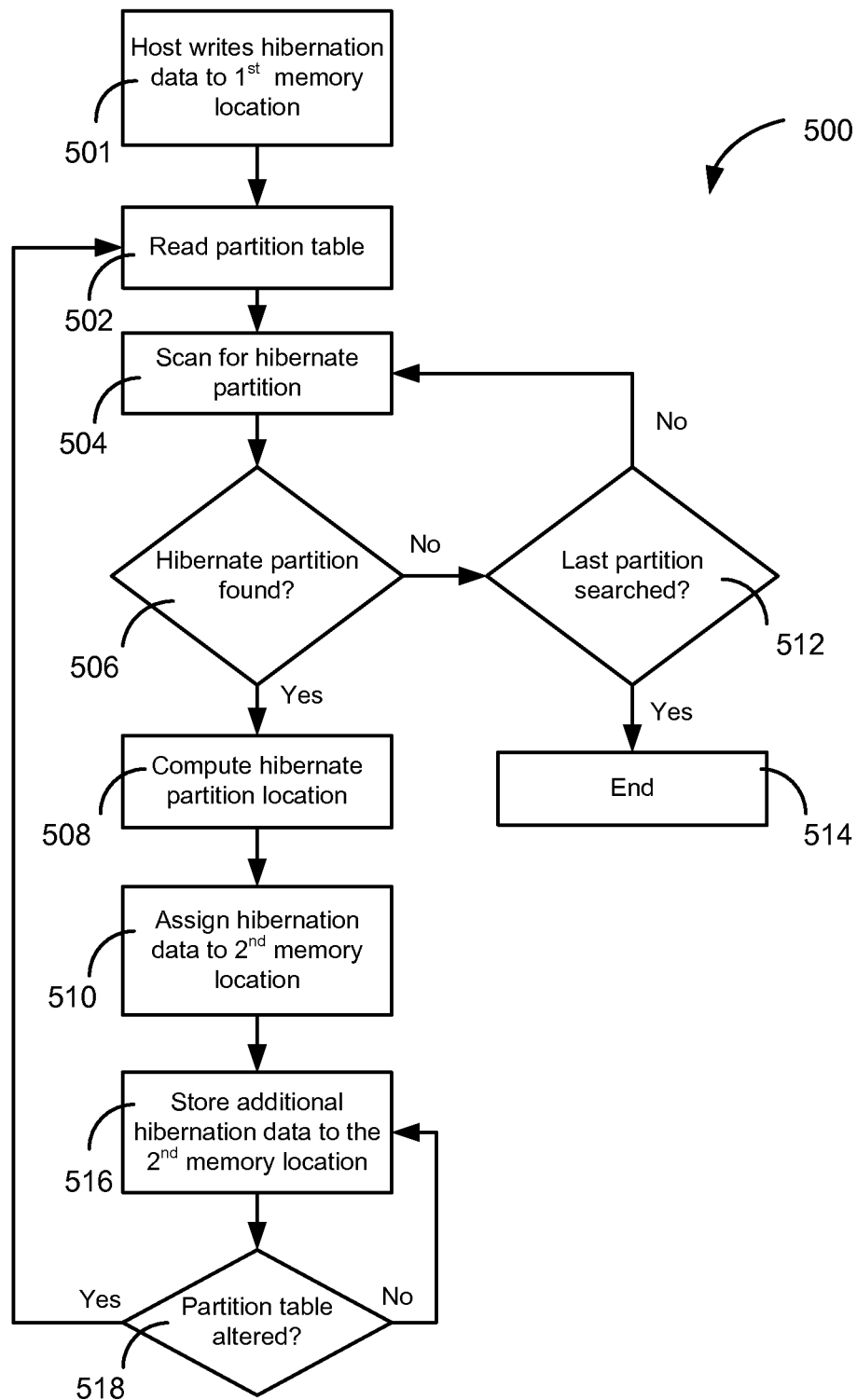
FIG. 5 is a flowchart of an illustrative embodiment of a method of fast resume from hibernate.

Referring to FIG. 5, a flowchart of an illustrative embodiment of a method of fast resume from hibernate is shown and generally designated 500. The method 500 can allow a DSD to self-determine which area of data storage is used for hibernation data without intervention or an indication from the host. The method 500 may include a host sending a command to the DSD to store data to a first memory location, at 501. The DSD may read a partition table, at 502, and may scan the partition table to determine the hibernation partition, at 504. The DSD can search for the hibernation partition by looking at the partition ID of each partition in the partition table, at 506, and determine when the partition ID indicates the associated partition is a hibernation partition. The partition table may be similar to the examples discussed earlier, such as a master boot record (MBR). If the hibernation partition is not found, the DSD may keep searching the partitions until the hibernation partition is found, at 512. If the hibernation partition is not found and all of the partitions have been searched, the search may end at 514. The DSD may end the scan at any time.

If the hibernation partition is found, the DSD can compute the hibernation partition location, at 508. The hibernation partition location may be computed by determining an LBA range of the hibernation partition. The DSD may then assign the hibernation data to a second memory location, at 510, by selecting an appropriate memory location and then designating the selected memory location to store the hibernation data. The selected memory location may include a nonvolatile solid state medium, and may have a faster access time than the first memory location. The DSD may store data intended for the hibernation partition in the selected memory location, at 516. Also, the DSD may search for additional hibernation data or partitions and may store additional hibernation data to the selected memory location, at 516.

On some instances, a partition table may be altered when the host writes to the DSD. The DSD can continually check to see if the partition table has changed, at 518. If the partition table has not changed, the DSD may continue storing hibernation data to the selected memory location, at 516. If the partition table has changed, the DSD can read the changed partition table, at 502, and start the process over. The DSD may not continually check to see if the partition table has changed, instead the DSD may periodically check, aperiodically check, check in response to a trigger event (such as a command, power event, or error indication), or not check for a change to the partition table.

In the implementations described herein, no intervention, instruction, or hint from a host is required to determine a location of a hibernation partition because a DSD can determine the location of the hibernation partition independently of the host, and determine if there is a different memory location that is preferential to store hibernation data. Further, the methods and functions herein may be implemented via the DSD 114 of FIG. 1 or the DSD 200 of FIG. 2.

The illustrations and examples provided herein are but a few examples of how the present disclosure can be applied to data storage systems. There are many other contexts in which the methods and systems described herein could be applied to computing systems and data storage systems. For example, the methods and systems described herein are particularly useful for computing systems and data storage devices having hybrid storage, such as when the computing systems or the data storage devices have at least one non-volatile solid state data storage medium and at least one disc storage medium or when a hybrid data storage device has two different types of nonvolatile memory with different properties and one of the types of memories is preferential to store hibernation data.

Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods and functions described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data storage device (DSD) including:
      a circuit configured to:
         determine a first memory location of hibernation data at a first nonvolatile memory in the DSD, without receiving an indication of the first memory location from a host, based on a hibernation partition of the DSD; and
         store the hibernation data to a second memory location at a second nonvolatile memory in the DSD.

2. The apparatus of claim 1, further comprising an interface configured to allow the DSD to be physically removed from the host and to receive commands from the host when the interface is coupled to the host.

3. The apparatus of claim 1, further comprising the circuit configured to, after the hibernation data has been stored at the second memory location, receive additional hibernation data, and store the additional hibernation data to the second memory location.

4. The apparatus of claim 3, further comprising the second storage location has a faster access time than the first location.

5. The apparatus of claim 4, further comprising the first storage location is a disc data storage medium and the second storage location is a non-volatile solid state storage medium.

6. The apparatus of claim 3, further comprising the additional hibernation data includes an instruction to store data to the first memory location.

7. The apparatus of claim 1, further comprising a partition identification system including a partition table that identifies a hibernation partition type associated with the hibernation partition.

8. The apparatus of claim 7, further comprising the circuit is configured to:
   determine if the partition table has been altered; and
   when the partition table has been altered, repeat determining a first memory location of hibernation data without receiving an indication of the first memory location from the host.

9. A method comprising:
   scanning, via a data controller within a data storage device (DSD) that is removable from a host, a partition table within the DSD for an indicator of a hibernation partition of a first nonvolatile memory location in the DSD without receiving an indication of the first memory location from a host; and storing data intended for the hibernation partition of the first nonvolatile memory to a second nonvolatile memory location of the DSD.

10. The method of claim 9, further comprising receiving additional data from the host intended for the first memory location, and updating the hibernation data at the second memory location with the additional data.

11. The method of claim 9, further comprising:

determining if a partition identification record has been altered; and when the partition identification record has been altered, repeating determining the location of the first memory location.

12. The method of claim 9, further comprising selecting a memory storage location for the second memory location that has a faster access time than the first memory location.

13. A device comprising:

a data storage device (DSD) including:

an interface configured to receive commands and data from a host computing system, and also configured to allow the device to be separated from the host computing system;

a first nonvolatile memory including a disc data storage medium;

a second nonvolatile memory including a solid state memory;

a controller configured to:

determine a location of a hibernation data within the DSD, without an indication of the location from the host computing system, via:

scanning a partition table stored within the DSD for an indicator of a hibernation partition of the first nonvolatile memory;

determining the location of the hibernation data based on the indicator;

store the hibernation data to a second data storage location of the second nonvolatile memory.

14. The device of claim 13 further comprising:

the controller further configured to receive additional hibernation data and store the additional hibernation data to the second data storage location.

\* \* \* \* \*